Dec. 7, 1926.
A. L. KNAPP
1,609,727
MOTOR VEHICLE
Original Filed Oct. 1, 1919
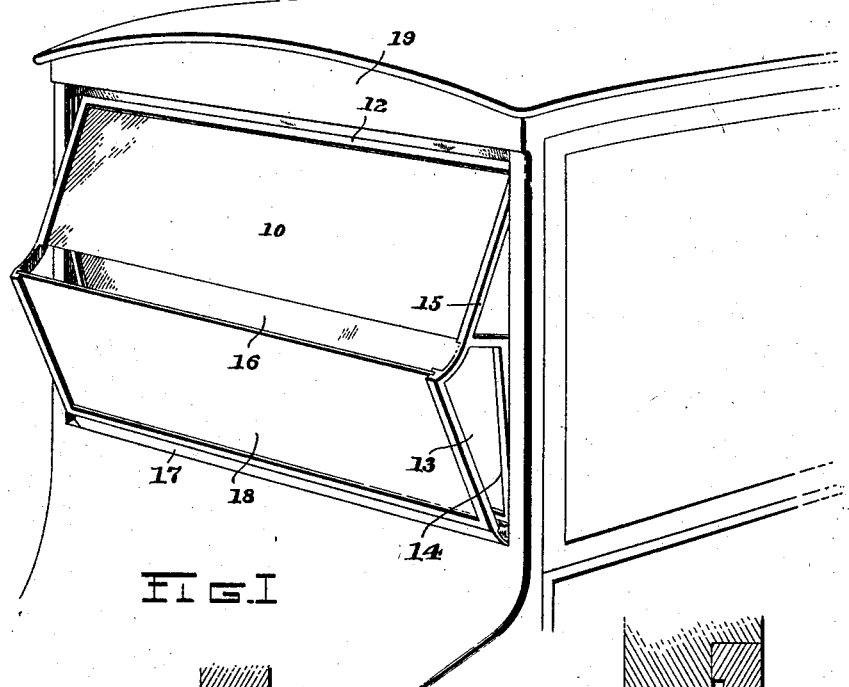
FIG.1
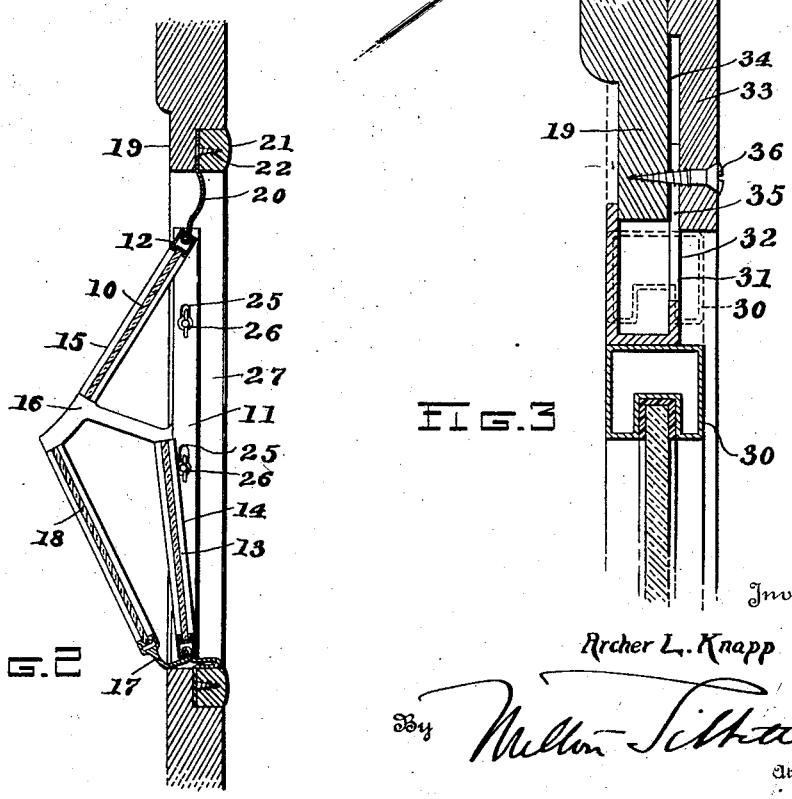
FIG.2
FIG.3
Inventor
Archer L. Knapp
By Milton Tibbetts
Attorney Patented Dec. 7, 1926.

1,609,727

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Original application filed October 1, 1919, Serial No. 327,699. Divided and this application filed February 16, 1925. Serial No. 9,381.

This application is a division of my application Serial No. 327,699 for motor vehicles filed October 1, 1919.

This invention relates to motor vehicles and particularly to the body and windshield construction thereof.

One of the objects of the invention is to provide for the vertical adjustment of the windshield relatively to the vehicle body while at the same time preventing the entrance of air or rain between the top of the windshield and the body.

With this object and others in view, the invention is embodied in the construction and arrangement hereinafter described and illustrated in the accompanying drawings.

In these drawings, Fig. 1 is a perspective view of part of a motor vehicle showing a windshield of the clear vision type applied thereto;

Fig. 2 is an enlarged vertical section of a clear vision windshield showing one form of my invention in connection therewith; and Fig. 3 is an enlarged sectional detail view of the upper part of a windshield and adjacent parts of the vehicle body showing another form of the invention.

Referring to the drawings, 10 indicates the upper sash of a rigid windshield. This sash extends forwardly and downwardly from the upper ends of vertical side rails 11 of the frame of the windshield, the cross rail 12 of which constitutes the upper border of the sash 10.

The lower half of the windshield preferably comprises two sashes, each extending angularly forward from the lower part of the main windshield frame, but at different angles to the rails of said frame and spaced apart. One of these sashes or sash members is indicated at 13, the side bars 14 of which extend up and are connected with the side bars 15 of the frame of the upper sash 10. The lower ends of these side bars 14 are fixed to the vertical main frame rails 11. The upper edge of the pane of the sash 13 terminates below the level of the lower edge of the upper sash 10, leaving a space 16 between the edges of these two sash members, which space affords a field of clear vision on a horizontal line with the eyes of the driver in the seat of the vehicle.

Connected to the lower part of the main frame of the windshield and extending forwardly in front of the sash 13 is a support or bracket 17 and the other inclined sash or sash member, indicated at 18, which latter extends forwardly and upwardly at a greater angle to the main frame of the windshield than does the sash 13. The upper edge of this sash 18 is substantially on a line with the upper edge of the sash 13 so that it does not interrupt the vertical space between the sashes 10 and 13, thereby maintaining the clear field of vision before the eye of the driver. The space between the sashes 13 and 18 is open at the sides whereby suction is created upon the air and rain that may enter through the space between the upper and lower sashes so that it will be drawn out to one side of the car and the driver will thereby be protected. A draft will be created from the car to the outside thereof that will induce ventilation through the car.

In order to obtain a vertical adjustment of the whole windshield frame so as to accommodate the clear vision space through the windshield to persons of varying heights, according to the construction of Fig. 2, the side rails 11 of the main frame are provided with vertical slots 25 adapted to be engaged by set screws 26 which enter the vertical posts 27 of the body. When the screws are loosened the windshield may be moved up or down with respect to the vehicle body and when the desired position has been determined upon the set screws are tightened and the windshield is thereby clamped in its set position. Identical clamping construction is provided at each side of the windshield frame.

To close the space between the upper rail of the windshield frame and the adjacent part of the vehicle top, a connecting strip of flexible material 20 is used. This collapsible piece 20 is secured to the fixed cross member 19 of the top by means of a clamping bar 21, screws 22 being used for the purpose. It is also suitably secured to the upper rail of the main frame of the windshield, and when the windshield is in its upper position the flexible strip will fold in between the windshield and the cross member 19 of the top.

At the lower end of the windshield frame between the edge thereof and the lower horizontal rail 28 of the body is provided a flexible strip 29 similar to strip 20 in its construction and in its mode of fastening.

These two strips 20 and 29 are continuous from side to side of the windshield and constitute closures which prevent the entrance of air and rain through the windshield at the top and bottom thereof, while at the same time permitting vertical adjustment of the windshield as a whole.

In Fig. 3, a construction is illustrated in which the means of obtaining the adjustment while maintaining a closed joint between the windshield and the adjacent portions of the top, consists of rigid members slidable with the windshield frame. Referring to the illustration of this arrangement, 30 indicates the top sash rail of the windshield frame and 31 indicates a metallic U-shaped member suitably fastened to said rail and having a part 32 adapted to bear against the rear face of the cross member or bar 19 which extends down from the roof of the vehicle and forms the top of the opening in which the windshield is placed. The other upwardly extending part of the U-shaped member 31 is adapted to bear against the front face of said cross member 19. A cover plate 33 is secured to the said cross member 19 but spaced therefrom to provide a vertical slot 34 in which the said rear portion 32 of the U-shaped member 31 of the windshield is adapted to slide, by which arrangement, not only is a guiding slot provided for the upper part of the windshield, but also the same is for the greater part thereof concealed from view at the rear of the windshield and a more ornamental finish for the inside of the vehicle body is provided.

In this construction the said rear part 32 which extends into the slot 34 is provided with one or more vertical slots 35 through which screws 36 are adapted to pass to clamp the windshield between the cover 33 and the cross member 19 and thereby hold it in various positions of adjustment.

The means thus described provides not only for adjustment of the windshield vertically in the opening in the front of the vehicle body, but it also provides a closure for the space between the upper edge of the windshield frame and the top.

Having thus described my invention, what I claim and desire to secure by Letters Patent is:

1. In a motor vehicle, in combination, a body having a windshield opening, a cross member forming the top of the windshield opening, a windshield adapted for vertical adjustment bodily in said opening, part of said windshield being slidable upwardly at the rear of said cross member as the windshield is moved to its upper position of adjustment, a separately formed cover plate secured to the body in spaced relation to said cross member, and means carried by and extending through said cover plate and arranged entirely above the lower edge thereof for holding the windshield frame in adjusted position.

2. In a motor vehicle, in combination, a body having a cross member, a windshield having a top rail provided with a U-shaped member having two upwardly extending parts, one of said parts being adapted to bear against the front face of said cross member and the other of said parts being adapted to bear against the rear face of said cross member, and means for holding the windshield in adjusted position relative to said cross member.

3. In a motor vehicle, in combination, a body having a windshield opening, a cross member forming the top of the windshield opening, a windshield adapted for vertical adjustment bodily in said opening, said windshield comprising a frame having a top sash rail, part of said windshield being slidable upwardly at the rear of said cross member as the windshield is moved to its upper position of adjustment, a separately formed cover plate secured to the body in spaced relation to said cross member, and means on said cover plate and connected to said cross member for holding the windshield frame in adjusted position.

4. In a motor vehicle, in combination, a body having a windshield opening, a cross member forming the top of the windshield opening, a windshield adapted for vertical adjustment bodily in said opening, part of said windshield being slidable upwardly at the rear of said cross member as the windshield is moved to its upper position of adjustment, a separately formed cover plate secured to the body in spaced relation to said cross member and extending downwardly far enough to cover a portion of the windshield at all times, and means on said cover plate entirely above the lower edge thereof co-operating with that part of said windshield slidable upwardly at the rear of the cross member for holding the windshield in adjusted position.

5. In a motor vehicle, in combination, a body having a windshield opening, a cross member forming the top of the windshield opening, a separately formed cover plate secured to the body in spaced relation to said cover plate, a windshield adapted for vertical adjustment bodily in said opening, part of said windshield being slidable upwardly into the space formed between the cross member and cover plate as the windshield is moved to its upper position of adjustment and part of said windshield in its lowest position of adjustment being above the lower edge of said cover plate, and means on said cover plate entirely above the lower edge thereof co-operating with that part of the windshield slidable in said space for holding the windshield in adjusted position.

In testimony whereof I affix my signature.

ARCHER L. KNAPP.